US007006983B1

(12) United States Patent
Packes, Jr. et al.

(10) Patent No.: US 7,006,983 B1
(45) Date of Patent: Feb. 28, 2006

(54) METHOD AND SYSTEM FOR PROCESSING A REBATE

(75) Inventors: John M. Packes, Jr., Hawthorne, NY (US); Jay S. Walker, Ridgefield, CT (US); James A. Jorasch, Stamford, CT (US); Daniel E. Tedesco, New Canaan, CT (US); Keith Bemer, New York, NY (US); John B. Dickerson, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/505,361

(22) Filed: Feb. 16, 2000

(51) Int. Cl.
*G06F 17/60* (2006.01)
(52) U.S. Cl. ....................................................... 705/14
(58) Field of Classification Search .................... 705/1, 705/14, 16, 21, 500
See application file for complete search history.

(56) References Cited

U.S. PATENT DOCUMENTS

| 4,248,334 | A | * | 2/1981 | Hanley et al. ................. 194/4 |
| 4,949,256 | A | | 8/1990 | Humble ....................... 364/401 |
| 5,002,313 | A | * | 3/1991 | Salvatore ..................... 283/102 |
| 5,139,286 | A | * | 8/1992 | Gold ............................ 285/105 |
| 5,200,889 | A | * | 4/1993 | Mori ............................ 364/401 |
| 5,287,268 | A | | 2/1994 | McCarthy .................... 364/405 |
| 5,368,129 | A | | 11/1994 | Von Kohorn ................. 186/52 |
| 5,467,269 | A | | 11/1995 | Flaten .......................... 364/401 |
| 5,483,049 | A | | 1/1996 | Schulze, Jr. .................. 235/383 |
| 5,642,279 | A | | 6/1997 | Bloomberg et al. ......... 395/214 |
| 5,710,886 | A | | 1/1998 | Christensen et al. ........ 395/214 |
| 5,729,693 | A | * | 3/1998 | Holda-Fleck ................ 395/214 |
| 5,761,648 | A | | 6/1998 | Golden et al. ................. 705/14 |
| 5,823,575 | A | | 10/1998 | Ives ............................... 283/58 |
| 5,845,259 | A | * | 12/1998 | West et al. .................... 705/14 |
| RE36,116 | E | | 2/1999 | McCarthy ..................... 705/16 |
| 5,892,827 | A | | 4/1999 | Beach et al. .................. 380/24 |
| 5,901,303 | A | * | 5/1999 | Chew .......................... 395/400 |
| 5,905,246 | A | * | 5/1999 | Fajkowski .................... 235/375 |

FOREIGN PATENT DOCUMENTS

CA          1276724         11/1990          ................. 354/34

OTHER PUBLICATIONS

"Storage: Epson extends Zip rebate program for holiday shoppers", Oct. 7, 1996, EDGE Publishing, EDGE: Work-Group Computing Report.*

(Continued)

*Primary Examiner*—Jeffrey D. Carlson
(74) *Attorney, Agent, or Firm*—Magdalena M. Fincham; Carson C. K. Fincham

(57) ABSTRACT

A point of sale (POS) rebate method and system allows a consumer purchasing a product having an associated manufacturer's mail-in rebate to redeem the rebate at the POS. Products that have associated manufacturer rebates are recognized when the products are purchased, e.g., based on information stored in a rebate database. When such products are identified, terms and conditions of a POS rebate are determined. The value of the POS rebate may be determined based on the value of the mail-in rebate offered by the manufacturer. The value of the POS rebate may be determined by querying a server containing rebate information, such as a server operated by or on behalf of the manufacturer or retailer. The consumer is then prompted to choose whether to keep the original manufacturer's mail-in rebate, or to accept the POS rebate, along with any terms and conditions associated with the POS rebate.

46 Claims, 7 Drawing Sheets

OTHER PUBLICATIONS

Aylward, Larry, "What's the Forecast?", Jul. 1, 1993, Aftermarked Business, p12.*

Nets season ticket holder rebate, Dec. 8, 1976, The New York Times, Col 5 p. 12, sec 2.*

Moore, John A., "Quaker State reacts quickly to Sears bottle," Apr. 1, 1987, Oil Daily, pB10.*

Alaimo, Dan, "Electronic rebates spark debate; Shopper rebates at Winn-Dixie supermarkets" Supermarket News, vol. 40; No. 21; p. 1; ISSN: 0039-5803 May 21, 1990.

"CheckRobot receives $1.5 million order" Business Wire, Jun. 26, 1990.

Gellene, Denise, "Loyalty: Check It Out; Supermarkets Track Top Patrons, Reward Them With Custom Deals" Los Angeles Times, Business; p. 1, Jul. 8, 1994.

"SMC Implements Instant Rebate Promotion for VAR Channel" Feb. 29, 1996.

Eckmann, Katy, "G&L Group Will Help Valu Solutions Introduce Retail Cash Rebate Card; G and L Group will handle its on-line cash rebate card promotions" ADWEEK Southwest, p. 3; ISSN: 0746-892X, Apr. 28, 1997.

"New Offerings Raise the Stakes In the Credit Card Rebate Game" Credit Card News, Jul. 1, 1997.

Bulkeley, William M., "Rebates ' Secret Appeal to Manufacturers: Few Consumers Actually Redeem Them" The Wall Street Journal, p. B1, Feb. 10, 1998.

"Catalina Marketing's Checkout Rebate Offers Simple Solutions to Traditional Rebate Programs; A&P and Pathmark Already Have Signed Up for the New Service" PR Newswire, Financial News Section, Feb. 24, 1998.

Wreden, Nick, "Get to Know Your Customer—Catalina Marketing Lets Retailers Find out who's really buying" Information Week, Jul. 13, 1998.

Beatty, Gerry, "Group's Dealers Get Multiuse Software; Best Brands" HFN The Weekly Newspaper for the Home Furnishing Network Section No. 28, vol. 72; p. 50, Jul. 13, 1998.

"AIM Smart In E-commerce Alliance With Copaken, White, Blitt to Provide Free Internet Shopping Sprees to Mall Shoppers" Business Wire, Dec. 15, 1998.

Shook, David, "Rebate Limits Can Be a Pain for Consumers" The Buffalo News, p. 7E, Jan. 5, 1999.

"The Express Group: Clearing Services" http://www.expressgroup.com (download date Feb. 10, 1999).

* cited by examiner

| PRODUCT IDENTIFIER 302 | PRODUCT MANUFACTURER IDENTIFIER 304 | PRODUCT DESCRIPTION 306 | PRODUCT PRICE 308 | MANUFACTURER REBATE AMOUNT 310 | POS REBATE TERM(S) 312 | CONDITION(S) 314 |
|---|---|---|---|---|---|---|
| 1234-5678 | ELECTRO | STEREO SYSTEM | $499.99 | $50.00 | 80% OF MAIL-IN REBATE AMOUNT | RETAILER CREDIT; EXPIRES 6-1-99 |
| 9876-5432 | MEDICINECO | 1500 PAIN RELIEVERS | $14.99 | $2.00 | $2.00 | PROVIDED AT POS; SURRENDER MAIL-IN REBATE AT POS |
| 1357-2468 | AUDIOWAVE | HOME SPEAKERS | $249.99 | $25.00 | $20.00 CREDIT | VALID ONLY FOR AUDIOWAVE PURCHASES |
| ABCDEF | AUDIOWAVE | SPEAKER WIRE | $49.99 | $5.00 | 100% OF MAIL-IN REBATE AMOUNT | MUST SURRENDER MAIL-IN REBATE |
| FEDCBA | COMPUTERCO | MOUSE | $29.99 | $3.00 | $2.00 | MUST REGISTER POS REBATE |

| CONSUMER IDENTIFIER 402 | CONSUMER NAME 404 | CONSUMER PHONE NUMBER 406 | CONSUMER E-MAIL ADDRESS 408 | CONSUMER STATISTIC(S) 410 ||| POS REBATE ACCOUNT VALUE 418 |
|---|---|---|---|---|---|---|---|
| | | | | AVERAGE MONTHLY SPENDING 412 | FREQUENCY OF VISITS 414 | REDEMPTION CHARACTERISTIC(S) 416 | |
| 111-222-333 | RICK RIVARD | (123) 555-1111 | RICK@ST.COM | $212.03 | 1/MO | 100% | $0.00 |
| 222-333-444 | RICHARD SANCHEZ | (345) 765-4321 | RSANCH@DRUM.COM | $53.60 | 2/MO | 75% | $15.00 |
| 333-444-555 | KEVIN KENNEY | (765) 769-0754 | KEVIN@NET.COM | --- | --- | --- | 20% OFF COUPON |

| OFFER IDENTIFIER 502 | CONSUMER IDENTIFIER 504 | PRODUCT IDENTIFIER 505 | ISSUING RETAILER 506 | TERM(S) 508 | CONDITION(S) 510 | ISSUE DATE 512 | REDEMPTION DATE 514 |
|---|---|---|---|---|---|---|---|
| 11-22-33 | 111-222-333 | 1234-5678 | ELECTRO | $40.00 | RETAILER CREDIT; EXPIRES 6-1-99 | 1-1-99 | 5-1-99 |
| 22-33-44 | 222-333-444 | 9876-5432 | MEDICINECO | $2.00 | CREDIT AT POS; SURRENDER MAIL-IN REBATE AT POS | 2-1-99 | 2-1-99 |
| 33-44-55 | 333-444-555 | 1357-2468 | AUDIOWAVE | $20.00 | VALID ONLY FOR AUDIOWAVE PURCHASES | 2-3-99 | — |
| 66-55-44 | 4444-1111-2222-3333 | XYZ-ABCD | COMPUTERCO | 50% OFF | MUST LOG-IN TO COMPUTERCO SITE TO REDEEM; VALID ONLY FOR COMPUTERCO PRODUCTS | 2-5-99 | — |

METHOD AND SYSTEM FOR PROCESSING A REBATE

FIELD OF INVENTION

The present invention relates to the field of product promotions, and more particularly, to a method and apparatus for processing rebates.

BACKGROUND OF THE INVENTION

Manufacturer rebates, such as mail-in rebates, are a popular way for manufacturers to offer price reductions directly to consumers. For example, a report by Cox Direct Inc., a direct-marketing company based in Largo, Fla., indicates that 76% of surveyed packaged-goods companies used money-back offers in 1996, which has increased from 66% in 1995. In addition, NCH NuWorld Marketing Ltd., a large U.S.-based coupon processor, indicates that the use of traditional cents-off coupons is decreasing, while the manufacturer rebate business is increasing, especially for higher-priced items.

Distributor or manufacturer rebates overcome some disadvantages associated with traditional manufacturer price reductions. With traditional manufacturer price reductions, retailers may elect to leave shelf prices unchanged and keep the difference between the shelf price and the manufacturer- or distributor-defined price. This eliminates the promotional value of the price cuts on the part of the manufacturer or distributor, because consumers cannot realize those discounts. Manufacturers may instead choose to utilize rebates as a means of offering price reductions directly to consumers. This is preferred because it ensures that the consumers are receiving the discount that the manufacturer wants them to receive.

Despite the rise in rebates, and their advantages over traditional price cuts, there are many deficiencies with manufacturer rebate programs. Redeeming mail-in rebates is time consuming, which often deters consumers from purchasing products with attached rebates, regardless of potential savings. Also, many rebates have associated expiration dates, which means that the rebate expires on a specific date regardless of when the product was purchased. Many consumers miss the materials required by the manufacturer to be eligible for the rebate and are thus unable to redeem the rebate. Some consumers simply do not attempt to redeem mail-in rebates because they do not trust that the rebate will actually be mailed to them.

Rebates can also be problematic for manufacturers, in that any mishandling of rebate redemption can generate ill will toward the manufacturer. Telephone-based help lines may be needed to deal with problems associated with rebate redemption, which means that a manufacturer must employ service representatives. As processing costs for thousands of mail-in rebates can be expensive, many manufacturers hire outside firms to handle rebate redemptions. Fraud is a concern for a manufacturer, especially where outside firms are retained to process the manufacturer rebates. As more entities participate in the processing of the rebates, the potential for fraud and mishandling can increase. Fraud can cost a manufacturer large amounts of money if their redemption procedures are not followed and their rebate coupons are mishandled. Thus, there exists a need for an improved rebate redemption system that will encourage consumers to purchase products with associated rebates, while minimizing rebate processing costs for a In manufacturer.

SUMMARY OF THE INVENTION

Methods and systems for processing a rebate are provided which overcome deficiencies associated with existing manufacturer rebate systems. In one embodiment, the present invention allows a consumer purchasing a product having an associated manufacturer's mail-in rebate to redeem the rebate at the point of sale (POS). Products that have associated manufacturer rebates are recognized when the products are purchased, e.g., based on information stored in a rebate database. When such products are identified, terms and conditions of a POS rebate are determined. In some embodiments, the value of the POS rebate is determined based on the value of the mail-in rebate offered by the manufacturer. The value of the POS rebate may be determined by querying a server containing rebate information, such as a server operated by or on behalf of the manufacturer or retailer. The consumer is then prompted to choose whether to keep the original manufacturer's mail-in rebate, or to accept the POS rebate, along with any terms and conditions associated with the POS rebate. If the consumer decides to accept the offer of the POS rebate, in one embodiment, the consumer is issued a credit for the value of the POS rebate. For example, the POS rebate can take the form of a voucher that is printed out by a terminal at the POS and given to the consumer, or by crediting an account such as a credit card account or a bank account. The POS rebate can also be recorded on a transaction card, such as a frequent shopper card.

According to one aspect of the present invention, the manufacturer determines the terms and conditions of the POS rebate and communicates these terms and conditions to the retailer periodically. In one embodiment, the manufacturer updates POS rebates by distributing updates to a rebate database. The rebate database may be centrally managed or it may be a distributed database. By allowing the manufacturer to specify, update and modify data in the rebate database, the manufacturer is able to maintain control over the cost associated with the POS rebate throughout the promotional period, as well as the value of the rebate to the consumer.

Embodiments of the present invention reduce the frustration and inefficiencies associated with issuing, processing, and redeeming manufacturer rebates. Because POS rebates according to the present embodiment are more efficient than manufacturer rebates, consumers may be more willing to purchase a product with an associated manufacturer rebate knowing that they will be offered the alternative of the POS rebate. Further, consumers will be assured that they will not lose their POS rebate, because credit information will be stored by the retailer and associated with a specific consumer.

The manufacturer will enjoy greater sales and profitability because of the increased efficiency and reduced operational cost and fraud losses associated with the system of the present invention. Further, the present invention will add an element of flexibility to the rebate redemption process for manufacturers, in that they will be able to adjust the terms and conditions of a POS rebate dynamically, based on redemption statistics or other criteria.

Retailers will benefit from this system in that, in certain embodiments, they are able to distribute more store credits. When a retailer distributes a store credit he can expect increased sales due to customer retention and return traffic. Additionally, the retailer may expect an amount of "breakage," or unused credit. Retailers may also benefit by being able to tailor promotional offers that are particularly suited to their consumer demographics. Other benefits and advantages of embodiments of the present invention will be apparent from the following detailed description and appended drawings.

BRIEF DESCRIPTION OF THE DRAWINGS

FIG. 3 is a tabular diagram illustrating an exemplary rebate database data structure according to an embodiment of the present invention;

FIG. 4 is a tabular diagram illustrating an exemplary consumer database data structure according to an embodiment of the present invention;

FIG. 5 is a tabular diagram illustrating an exemplary redemption database data structure according to an embodiment of the present invention;

DETAILED DESCRIPTION

Figure 1:
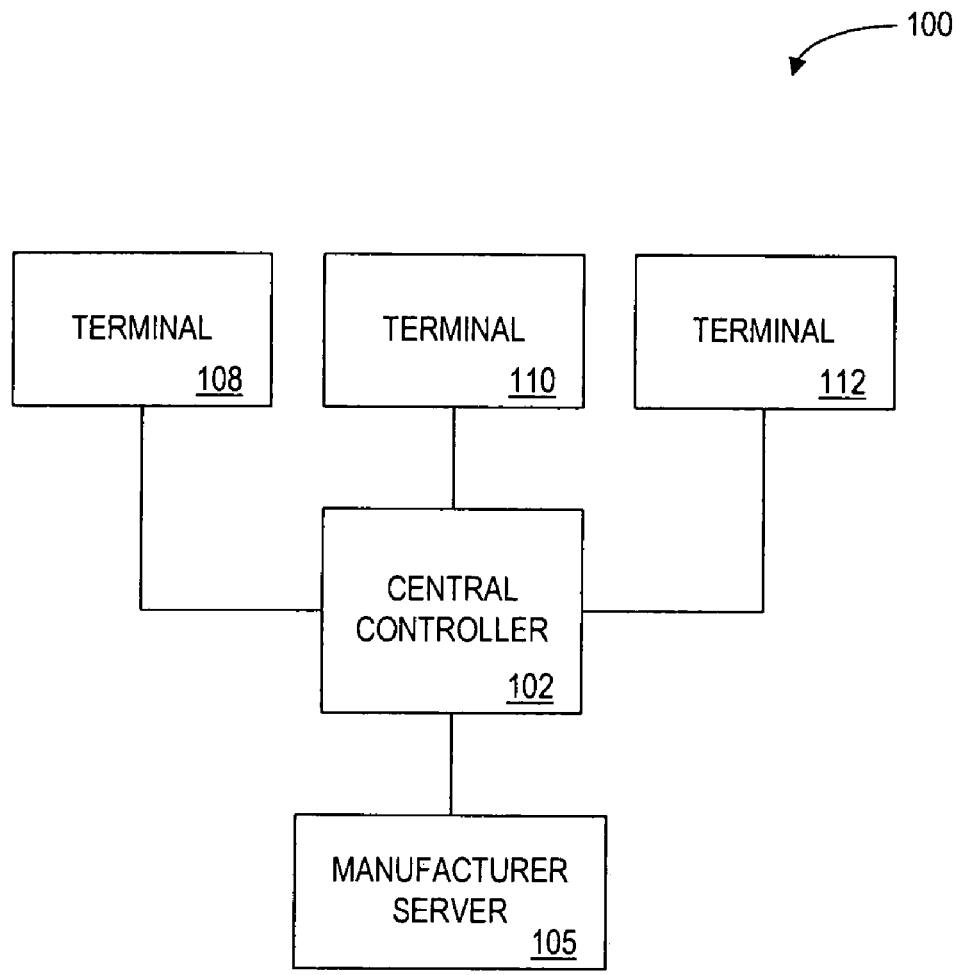
FIG. 1 is a block diagram illustrating a rebate processing system according to an embodiment of the present invention.

A rebate processing system 100 according to one aspect of the present invention is shown in FIG. 1. System 100 includes a central controller 102 in communication with a plurality of terminals 108–112. The central controller 102 may also be in communication with one or more manufacturer servers 105. The central controller 102 may communicate with the terminals 108–112 and the manufacturer server 105 directly or via an appropriate network, such as the Internet.

In one embodiment, some or all of the terminals 108–112 are retail POS terminals, such as, for example, the NCR 7454 terminal manufactured by NCR Corp. or the IBM 4683 manufactured by IBM Corp. or other retail terminal devices known in the art. Some or all of the terminals 108–112 and the manufacturer server 105 may comprise computers, such as those based on the Intel® Pentium® microprocessor, that are adapted to communicate with the central controller 102. In an on-line transaction, such as a transaction occurring via the Internet, some or all of the terminals 108–112 may be a computer operated at, e.g., the consumer's home or place of business acting together with, e.g., a Web server operated by or on behalf of a retailer. Further, some or all of the terminals 108, 110, 112 may comprise kiosks, hand-held computers, or any other input/output device with communications capabilities. For example, one such hand-held device is the Nino 300 Personal Companion®, manufactured by Philips Electronics N.V. Another example is the InfoMobile smart phone manufactured by Samsung Electronics, each of which utilizes the Windows® CE operating system manufactured by Microsoft Corp. Any number of the terminals 108–112 may be in communication with the central controller 102.

Communication between the terminals 108–112, the manufacturer server 105 and the central controller 102 may be direct or indirect, such as over the Internet through a Web site maintained by an entity operating the central controller 102 on a remote server or over a public or private on-line data network including commercial on-line service providers, bulletin board services, or the like. In other embodiments, the devices may communicate with the central controller 102 over RF, cable, satellite, or other communications links. The choice of communications interface for the central controller 102, the manufacturer server 105, and the terminals 108–112 may depend on the type of connection used. In embodiments using a network connection, the network need not be limited to any particular network protocol or topology, and may be a dedicated network or a shared network. For security and reliability reasons, a dedicated network having encryption and authentication functionality may be used.

Those skilled in the art will recognize that the devices need not be in constant communication with each other. On the contrary, the terminals 108–112, the manufacturer server 105 and the central controller 102 need only transmit to each other as necessary, and may actually refrain from exchanging data most of the time. For example, a device in communication with another device via the Internet may not transmit data to the other device for weeks at a time.

The central controller 102 may function as a "Web server" that generates Web pages (documents on the World Wide Web that typically include a hypertext mark up language, or HTML file and associated graphics and script files) that may be accessed via the Web and which allow communication with the central controller 102 in a manner known in the art.

The system 100 may be implemented entirely or partially within a retail location, and may be entirely or partially operated by or on behalf of a retailer. In the context of the present invention, a retailer includes any entity that sells products or services. Throughout this specification, the term "product" is used to refer to products, goods and services. The term "retail location" is used to refer to both physical and remote or virtual retail sites. For example, a physical retail location may consist of a building or a portion of a building, or it may consist of a plurality of buildings, such as a chain of retail stores operating under common ownership, name, or management, for example. A virtual retail location may be one or more Web sites operated to sell goods or services. In such a case, there may not be a physical retail location, and portions of the system 100 may include a consumer's computer or software within a consumer computer. In the context of the present invention, the term "consumer" is used to generally refer to an individual or entity who purchases a product, and the term "redeem" is used to refer to the exchange of something for value (for example, "redemption" of a POS rebate is the exchange of the POS rebate for something of value, such as a coupon, cash, a product, a discount, electronic cash, etc.).

Figure 2:
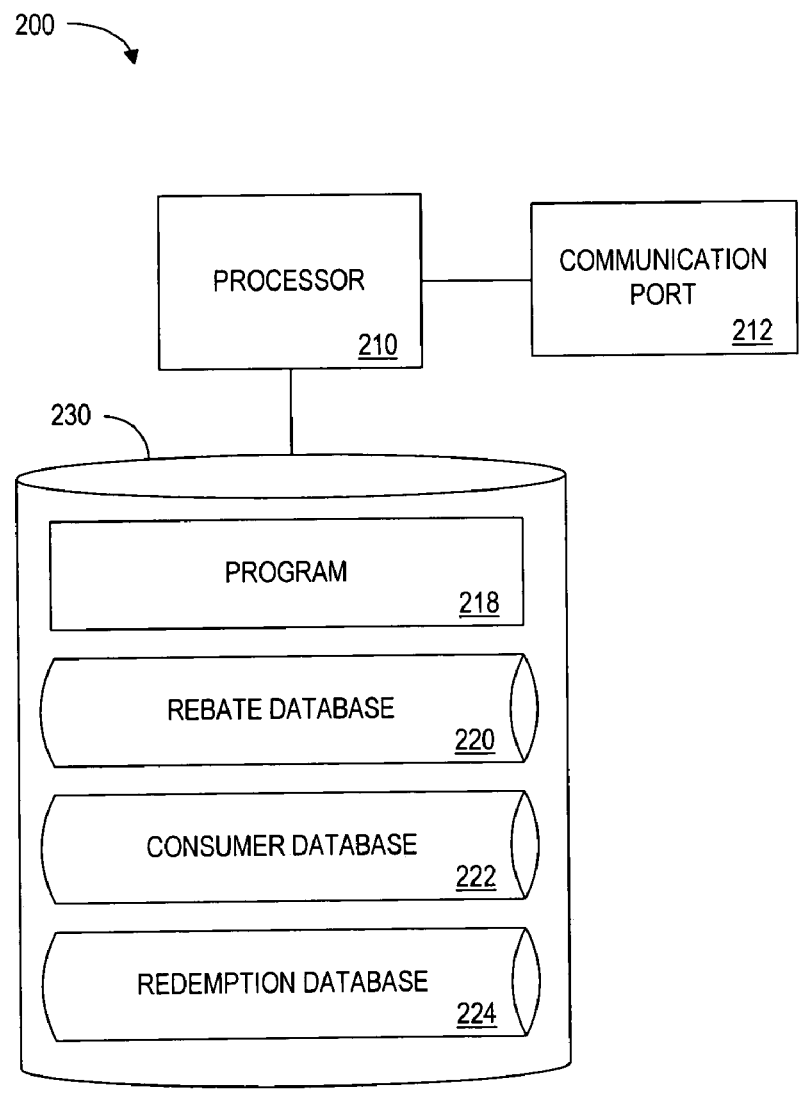
FIG. 2 is a block diagram of the server according to one embodiment of the present invention.

FIG. 2 is a block diagram of an exemplary embodiment of a server 200 representing the central controller 102 of FIG. 1. The server 200 may be any computing device that can communicate with one or more terminals 108, 110, 112. The server 200 comprises a processor 210, such as one or more INTEL® Pentium microprocessors. The processor 210 is coupled to a communication port 212, through which the processor 210 communicates with other devices.

The processor 210 is also coupled to a data storage device 230. The data storage device 230 may comprise, for example, a combination of magnetic, optical and semiconductor memory, including Random Access Memory (RAM) and Read-Only Memory (ROM) memory units. The processor 210 and the data storage device 230 may be, for example: (i) located entirely within a single computer or other computing device; or (ii) connected by a remote communication medium, such as a serial port cable or a telephone line. In one embodiment, the server 200 may comprise one or more computers that are connected to a remote server computer for maintaining databases.

The data storage device 230 stores a program 218 for controlling the processor 210. The processor 210 executes instructions of the program 218, and thereby operates in accordance with the present invention. The program 218 is adapted to be executed by the processor 210 and may be stored in a compressed, uncompiled and/or encrypted format. The program 218 may also include program elements, such as an operating system, a database management system and "device drivers" that let the processor 210 communicate with other devices. Appropriate device drivers and other program elements are known to those skilled in the art, and are not described in detail herein.

Methods for implementing database access by a server are well known and are continually being developed, and the present invention is not limited to the implementations described above. Additionally, although only one server or controller is shown, the system 100 may also consist of more than one controller or data storage device.

The data storage device 230 also stores: (i) a rebate database 220; (ii) a consumer database 222; and (iii) a redemption database 224. The databases 220, 222, and 224 are described in detail below and are depicted with entries in the accompanying FIGS. 3 through 5. As will be understood by those skilled in the art, the schematic illustrations and accompanying descriptions of the databases presented herein are merely exemplary arrangements for stored representations of information. Any number of other arrangements may be employed besides those suggested by the tables shown. For example, although the databases are shown as stored in a single data storage device, they may be distributed between data storage devices. Further, some or all of the databases may be stored locally at the terminals 108, 110 and 112 and at the manufacturer server 105. For example, each of the terminals 108, 110 and 112 may store copies of the databases and may receive updated information from a central source, such as the central controller 102 and/or the manufacturer server 105. The illustrated entries of the databases merely represent exemplary information, and those skilled in the art will understand that the content of these entries will vary.

Databases

The data storage device 230 preferably includes: (i) a rebate database 220, which is used to identify products and associated POS rebate terms and conditions; (ii) a consumer database 222, which is used to identify consumer information; and (iii) a redemption database 224, which is used to record information on the issuance and redemption of POS rebates. Exemplary embodiments of the rebate database 220, consumer database 222, and redemption database 224, are shown in FIGS. 3, 4, and 5, respectively. As will be understood by those skilled in the art, the schematic illustrations and accompanying descriptions of the databases presented herein are exemplary arrangements for stored representations of information. A number of other arrangements may be employed besides those suggested by the figures. For example, program 218 and/or data in the various databases may be distributed between memory of the central controller 102 and memory of the various terminals 108–112, as well as memory of other devices or servers, such as the manufacturer server 105. Similarly, the illustrated entries of the databases represent exemplary information, and those skilled in the art will understand that the number and content of the entries can be different from those illustrated herein.

Referring now to FIG. 3, a table 300 is shown depicting sample data and fields of the rebate database 220 (FIG. 2). The table 300 preferably includes fields for: a product identifier 302; a product manufacturer identifier 304; a product description 306; a product price 308; a manufacturer rebate amount 310; a POS rebate term(s) 312; and one or more condition(s) 314. As shown in FIG. 3, one of the POS rebate term(s) 312, is a value of the POS rebate expressed as a dollar amount or as a percentage of the manufacturer rebate amount 310. Other term(s) of the offer may also be specified as well. The condition(s) 314 field is included to inform the consumer how the POS rebate will be processed, and what condition(s) must be met in order to redeem the POS rebate. Multiple sets of data fields 312 and 314 may be provided defining terms and conditions of multiple POS rebates.

In FIG. 4, a table 400 is shown depicting example data and fields of the consumer database 222. Each of the records of the table 400 preferably include fields for: a consumer identifier 402; a consumer name 404; a consumer phone number 406; a consumer e-mail address 408; a consumer statistic(s) 410; and a POS rebate account value 418. As shown in table 400, consumer statistic(s) 410 can include information such as: an average monthly spending 412; a frequency of visits 414; a redemption characteristic(s) 416; etc. As a new record for a consumer is created, data identifying the consumer is stored in the field for the consumer identifier 402. This consumer identifier may be, e.g., a unique number generated by the controller, or may be data provided by the consumer such as a credit card number, a debit card number, a social security number, a telephone number, a frequent shopper number, or the like.

POS rebate account value 418 is an optional field which may store a cumulative amount of value that has been credited to but not yet used by the consumer identified by consumer identifier 402. According to embodiments of the invention, this information is used to establish or to further refine the value of POS rebates as will be discussed in further detail below.

A number of consumer statistics may also be tracked and used to establish or refine POS rebates. For example, a rebate redemption rate (not shown) may be tracked. For example, if the consumer has a history of redeeming every POS rebate every time, he may be offered a dollar-for-dollar POS rebate every time. Another consumer that never returns his rebates to the manufacturer may be offered a POS rebate having a value equal to, e.g., 85% of the value of the manufacturer rebate. Thus, the value of a particular POS rebate may be lower than other POS rebates on the same product, and may have an associated condition that the consumer's redemption rate (or redemption behavior) be above a certain threshold value to qualify for that particular POS rebate. If the condition is not satisfied, that POS rebate is preferably not presented to the consumer.

Alternatively, the opposite may occur. For example, before a POS rebate is offered to a consumer, the consumer's record from the consumer database 222 (FIG. 2) may be queried to determine his rebate redemption rate. If the consumer has a history of redeeming every rebate every time, he may not be offered a dollar-for-dollar POS rebate, but he may be offered a POS rebate valued at a percentage of the manufacturer rebate, such as 80%. Another consumer who never returns his rebates to the manufacturer may be offered 120% of the original manufacturer rebate value. This may be an incentive for the consumer to accept the POS rebate rather than redeeming the manufacturer rebate.

In FIG. 5, a table 500 is shown depicting sample data and fields of the redemption database 224 (FIG. 2). The records of table 500 preferably include fields for: an offer identifier 502; a consumer identifier 504 (preferably the same as or corresponding to the consumer identifier 402 of FIG. 4); a product identifier 505 (preferably the same as or corresponding to the product identifier 302 of FIG. 3); an issuing retailer 506; a term(s) 508; a condition(s) 510; an issue date 512; and a redemption date 514. In one embodiment, records of this database are populated with data when a POS rebate is generated for or issued to a consumer.

The offer identifier 502 is generated when a consumer is issued a POS rebate (e.g., when the consumer accepts an offer to exchange a manufacturer rebate for a POS rebate). This identifier may be, e.g., a number or a set of alphanumeric characters selected to uniquely identify each POS rebate. The consumer identifier 504 is preferably the same as, or related to, the consumer identifier 402 of the consumer database 222 (FIG. 2) and is used to identify the consumer who has received the POS rebate. In some embodiments, e.g., where a consumer wishes to remain anonymous and the manufacturer and retailer allow it, no consumer identifier or other consumer identifying information need be provided. A product identifier is provided in field 505. This product identifier may be the same as or related to the product identifier stored in field 302 of FIG. 3 and is used to associate a particular offer with a particular product. Information is also provided identifying an issuing retailer 506 of the POS rebate.

The issuing retailer field 506 may include a name of the retailer, and may also include more detailed identifying information such as an address of the retailer and the like. The term(s) 508 and condition(s) 510 of the POS rebate corresponding to the offer identifier 502 are also included in redemption database 224 (FIG. 2). This information defines, e.g., the value of the POS rebate as well as any requirements that must be fulfilled to receive the value of the offer. These terms and conditions 508, 510 may be identical to the terms and conditions 312, 314 of FIG 3, or they may be different based on, e.g., modifications made by the retailer. For example, a retailer may choose to add an additional value term to the offer.

An issue date 512 of the POS rebate is also included in the redemption database 224 to record the date on which the consumer received and accepted the POS rebate identified by the offer identifier 502. This may be used as a reference to determine whether the offer has expired and also to track the number of outstanding POS rebates which have been issued. Expiration information may be stored at individual POS terminals, at a central manufacturer server, etc. Further, an expiration date of an offer may be provided as a term or condition of the offer.

A redemption date 514 is also provided. This field remains empty (or otherwise indicates a status of "NOT REDEEMED") until the POS rebate identified by the offer identifier 502 has been redeemed. This is used, as will be discussed below, to ensure that a POS rebate is not redeemed more than once. The redemption database 224 (FIG. 2) may include other fields and information as needed to track outstanding and issued POS rebates.

The database records of the product database 220, the consumer database 222, and the redemption database 224 may be maintained as separate tables within a single database program. Those skilled in the art will recognize that a number of different types of database arrangements and designs may be used.

POS Rebate Issuance

Figure 6:
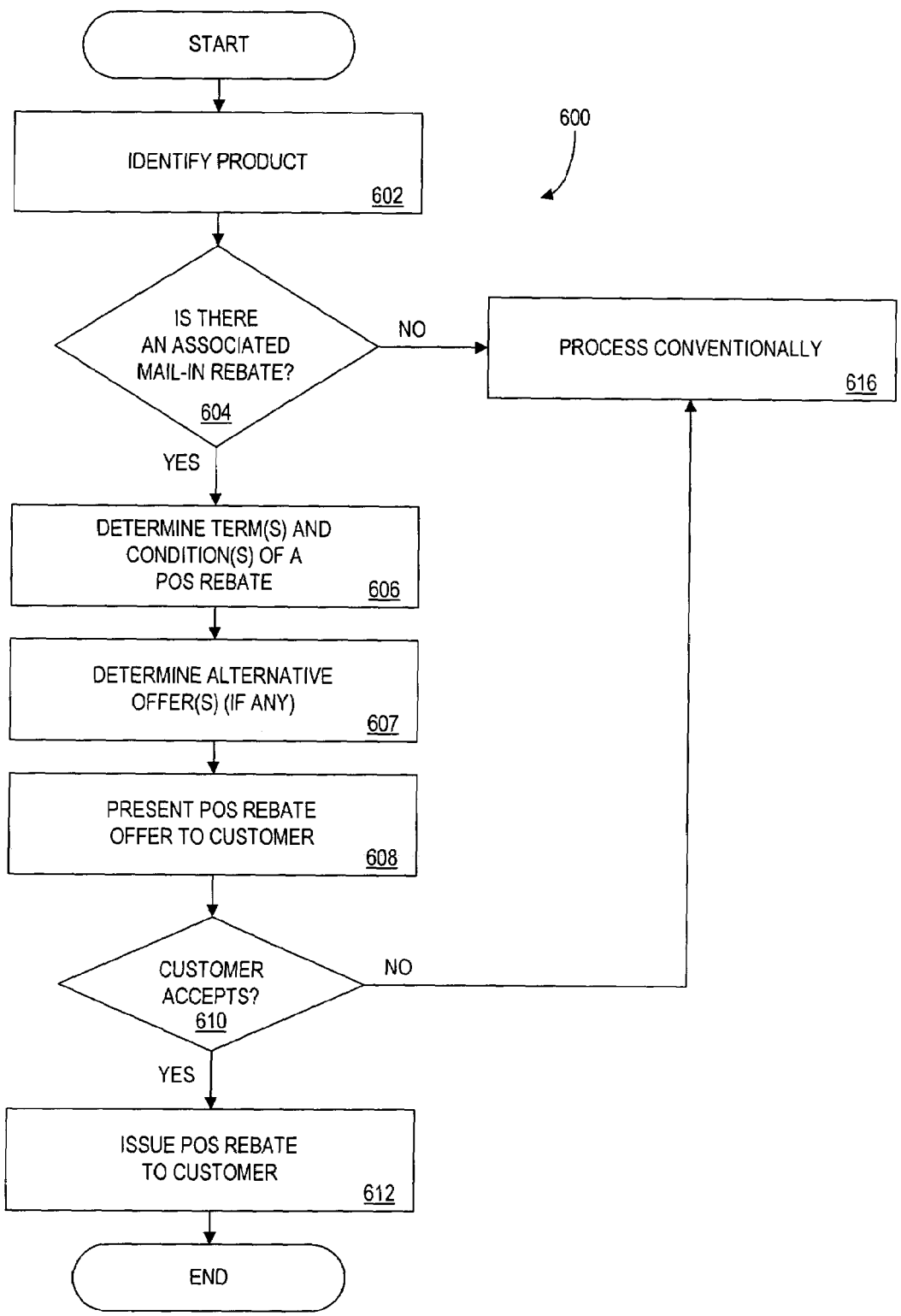
FIG. 6 is a flow diagram illustrating a method for issuing a POS rebate according to an embodiment of the present invention; and, FIG. 7 is a flow diagram illustrating a method of redeeming a POS rebate according to an embodiment of the present invention.

A method for issuing a POS rebate 600 according to an embodiment of the present invention is shown in FIG. 6. In one embodiment, this process is conducted at a retail POS (e.g., at a retail check-out counter). Alternatively, or in addition, this process may be partially or wholly conducted over a network (e.g., by interacting with a Web-based merchant from a consumer's desktop computer over the Internet).

Issuing a POS rebate 600 begins by identifying a product for purchase, as shown at 602. This product identification may be performed in a number of ways known to those skilled in the art such as, for example, part of a scanning operation. In a retail embodiment, for example, a bar code and/or a Universal Product Code (UPC) printed on or associated with the product or product packaging may be scanned by a laser scanner or other reading device in communication with a terminal 108, 110, or 112 to identify the product. Reference to a database may be made to match the product's UPC code to other product characteristics, such as the product identifier, product manufacturer, description, or price, for example. Alternatively, the product identifier (item 302 of FIG. 5) stored in the rebate database 220 (FIG. 2) may be the UPC code. Products can be identified by referring to product information stored at the terminal 108, 110, or 112, or the product identification can be made by referring to product information stored at the central controller 102 and/or the manufacturer server 105.

In one embodiment, the product may be identified from a manufacturer rebate coupon accompanying the product, and input to a terminal 108, 110, 112 (FIG. 1). For example, the mail-in rebate coupon may have a bar code or other machine-readable indicia which may be scanned or otherwise read at the POS to identify the product. Product identification may also be performed by means other than scanning, such as by a store clerk looking at a product label to locate a product identifier, and inputting the identifier into a terminal 108, 110, 112. In an online product purchase, product identification may be performed by the consumer selecting a product shown on a Web screen, and/or selecting to put the product into his/her virtual shopping cart, for example. Such techniques for identifying products are known to those of ordinary skill in the art.

Once the product has been identified, the product identifier (item 302 of FIG. 3) is used to retrieve information regarding the product. This information is first used to determine whether the product has an associated manufacturer rebate (at 604), and is also used to determine details about the terms and conditions of the manufacturer rebate. For example, the amount of the manufacturer rebate (item 310 of FIG. 3) is retrieved. If the product does have an associated manufacturer rebate, the information is then used to assist in determining the terms and conditions of a POS rebate (at 606). The POS rebate preferably includes at least one term identifying the value of the POS rebate. The value of the POS rebate indicates, for example, the benefit that the consumer may elect to receive in lieu of the manufacturer's rebate (e.g., the amount of cash, the amount of credit, the type of product, or other value).

The terms and conditions of the POS rebate may be determined locally (e.g., at the POS terminal) or by reference to remote sources of information (e.g., by querying a database at a server maintained or operated on behalf of the manufacturer). For example, during checkout, a terminal, such as terminal 108 (FIG. 1), may be used to cause a server to access a database to determine whether a manufacturer rebate exists for the product, and the amount of credit that the manufacturer is currently offering consumers for the rebate (i.e., the current value of the POS rebate). By accessing or otherwise receiving information from the database, the terminal 108 can determine the value of the POS rebate from the POS rebate term(s) field 312, and any associated condition(s) from the condition(s) field (item 314 of FIG. 3). Alternatively, or in addition, the terminal 108 may cause the manufacturer server 105 to retrieve this information.

In one embodiment of the present invention, each manufacturer is able to vary the terms and conditions (e.g., the value of the POS rebate and any redemption conditions, etc.) of POS rebates based on factors such as: available inventory for the product associated with the manufacturer's rebate, the expected breakage for the rebate program, the number of manufacturer rebates that have been redeemed, expected new product introduction dates, etc. In this manner, the manufacturer can dynamically manage inventory and control the amount of money it pays out for each POS rebate on a product-by-product basis, thereby giving the manufacturer greater control over the cost of a given promotion. The manufacturer can do this substantially in real-time, for example, by establishing the terms and conditions associated with a POS rebate each time a product having a manufacturer rebate is identified. The manufacturer can do this on a periodic basis, for example, by establishing the terms and conditions of POS rebates for particular products hourly, daily, weekly, or on some other non real-time schedule. Further details regarding this ability to manage and update POS rebates will be provided below.

In one embodiment of the present invention, the value of the POS rebate is calculated by retrieving the manufacturer rebate amount 310 (FIG. 3) and modifying it based on the POS rebate term(s) 312. For example, the value of a POS rebate may be 80% of the value of the manufacturer rebate. Alternatively, the value of a POS rebate may simply be determined at the POS device (e.g., a manufacturer rebate coupon may indicate the value of the offer if accepted as a POS rebate rather than as a mail-in rebate).

In another embodiment of the present invention, the value of the POS rebate may consist of several different types of value. For example, a consumer may be offered a POS rebate which includes an instant credit (e.g., $5.00 at the POS) and a future credit (e.g,. a $5.00 store credit for future purchases). Other combinations may be constructed using techniques of the present invention.

A number of conditions may be established at 606 such as, for example: a requirement that the consumer sign and turn in the manufacturer rebate at the time of purchase, a requirement that the POS rebate be redeemed within 30 days, and a restriction that the POS rebate only be used for store credit at a particular retailer.

Other terms and conditions of the POS rebate may also be calculated or determined at 606. For example, a manufacturer may choose to reward individual consumers based on their "value" as determined by purchasing statistics. The manufacturer and/or retailer may retain consumer statistics of individual consumer's purchasing history. For example, this information may be used to provide a POS rebate with increased value to an established consumer or to a repeat buyer of the manufacturer's products.

Processing at 606 may also include some determination or calculation of terms and conditions imposed by the retailer. For example, the value of the POS rebate may also be established based on the "value" of the consumer to the retailer. That is, certain consumers exhibiting desired behavior such as repeat business, high frequency of visits, high dollar volume, etc., may be offered higher-valued POS rebates, or POS rebates with fewer restrictions. Alternatively, shoppers who tend to spend less money or shop less frequently can be offered higher valued POS rebates to encourage them to shop more. Further, a retailer may specify an additional and/or alternate POS rebate having specific conditions that the consumer must meet to be eligible for the offer (e.g., the consumer must have a certain purchasing history, as mentioned above).

Another condition which may be established is that the original manufacturer rebate certificate must be surrendered to the retailer. That is, consumers may be required to surrender their original mail-in rebate and proof of purchase to redeem a POS rebate. This prevents a consumer from accepting and redeeming a POS rebate, and also redeeming the manufacturer's rebate coupon with the manufacturer (i.e., prevents consumers from redeeming both the mail-in and POS rebate). A consumer may also be prevented from redeeming both rebates by requiring the consumer provide their address when selecting the POS rebate. This information can then be used to inform the manufacturer so that the manufacturer will not issue a manufacturer rebate check to that particular individual.

In a further embodiment, the terms and conditions of a POS rebate may be determined without further input from the product manufacturer. For example, terms and conditions of POS rebates may be pre-established and stored in database 220 (FIG. 2). In this embodiment, the retailer may act as a rebate processor for manufacturer and POS rebates. For example, the terms and conditions of the POS rebate may be the same as the terms and conditions of the manufacturer rebate. The consumer may be inclined to take the POS rebate because it will be instantly issued at the POS. In this embodiment, the retailer may pre-arrange to pass on a percentage of the full manufacturer rebate to the manufacturer. In this example, the pre-arranged percentage can be a set term in rebate database 220. For example, a retailer and manufacturer may agree in advance that the manufacturer will absorb only 50% of the full manufacturer rebate for the offers that are processed by the retailer. This reduces uncertainty of the manufacturer regarding redemption rates through the retail operation, while still allowing the terms of the manufacturer rebate to be presented to the consumer. This saves the manufacturer some of the costs of fulfillment. In addition, the retailer may add store credits or other additional incentives to either the manufacturer's rebate, or to the POS rebate in order to retain consumers.

In one embodiment, the retailer may establish a value of the POS rebate based on transaction information. For example, during a checkout, a retailer may first identify that a POS rebate is available for a product being purchased. The retailer may establish the value of the POS rebate by first determining the total transaction value for the checkout. For example, if the total transaction value is $11.43 (before any rebate), and the transaction includes a product which has a $1.00 manufacturer rebate, the retailer may establish a POS rebate offer value of $0.43 on the theory that the consumer may be attracted to accept a rounded price. Other factors and considerations may also be used by the retailer in establishing a value for POS rebates according to embodiments of the present invention.

In certain embodiments, a retailer may give the consumer a choice between alternative POS rebates by determine or establish alternative offer(s) for the consumer (at 607). The retailer may utilize the POS rebate as a mechanism to generate alternative offers for consumers. For example, in one embodiment, the retailer may present an alternative product to the consumer in exchange for surrender of the manufacturer rebate coupon. As an example, if a consumer has a manufacturer rebate coupon valid for $10.00 off the purchase of a certain product, the retailer may present the consumer with an option to take a product in lieu of the $10.00 rebate. In this way, a retailer can utilize POS rebates to manage inventory (e.g., by moving distressed inventory).

Alternatively, the retailer may allow the consumer to specify some terms and conditions of the desired rebate, such as the selection of a product category (e.g., electronics, tools, etc.) for which the rebate may be used, or an amount of money. The retailer may then determine whether it can offer any rebates meeting those conditions.

Once the terms and conditions of the POS rebate have been established and any alternative(s) presented, the POS rebate is presented to the consumer (at 608). The POS rebate may be presented to the consumer in a number of ways, for example, by displaying the offer on a terminal screen, by printing the offer on a receipt or coupon, by displaying the offer to a retail employee who recites the POS rebate to the consumer, or in the case of an on-line purchasing session, by displaying the POS rebate on the consumer's computer screen. In one embodiment, the POS rebate is presented to a consumer by printing the offer on a receipt. The receipt is then presented to redeem the POS rebate. Alternatively, the POS rebate may be presented orally to the consumer by a device having synthesized or recorded speech characteristics, for example. The consumer may then be prompted to choose whether to keep the original manufacturer's rebate, or to have the determined value of the POS rebate issued to the consumer. In an Internet embodiment, for example, a "pop-up" dialog box may prompt the consumer for a selection.

At 610, the consumer may choose to either accept the POS rebate (i.e., choose the terms and conditions of the POS rebate instead of the terms and conditions of the manufacturer rebate) or to decline it (i.e., choose to keep the manufacturer rebate rather than accept the POS rebate). The consumer's selection between the manufacturer rebate and the POS rebate is input into the rebate processing system. This input may be made into the terminal by keying the selection into a keypad, speaking the selection into a voice-activated device, or touching appropriate fields within a touch screen, for example. In an online product purchase, the consumer input may be accepted from a consumer by using a dialog box on a Web browser screen, for example. If the consumer declines the POS rebate, the transaction is processed conventionally (at 616). For example, for a mail-in manufacturer rebate, the consumer must mail in the rebate to redeem it.

In accordance with another aspect of the present invention, the consumer may be presented with more than one POS rebate depending upon a number of factors. For example, a second POS rebate may be presented if one or more predetermined conditions are met. That is, a second POS rebate may be associated with the product, and may indicate a higher-valued POS rebate if the consumer presents a predetermined product or group of products for purchase. The predetermined product(s) may be a related product from the same manufacturer. For example, a POS rebate for a stereo system may have a higher value if the consumer is also purchasing speakers from the same manufacturer. In this manner, the manufacturer can encourage the purchase of certain products associated with the initial product selected for a POS rebate promotion. Alternatively, the retailer may be given the option to select a product to be associated with the second POS rebate. The product may be from the same or a different manufacturer, allowing the retailer the flexibility of creating desirable promotions.

Figure 7:
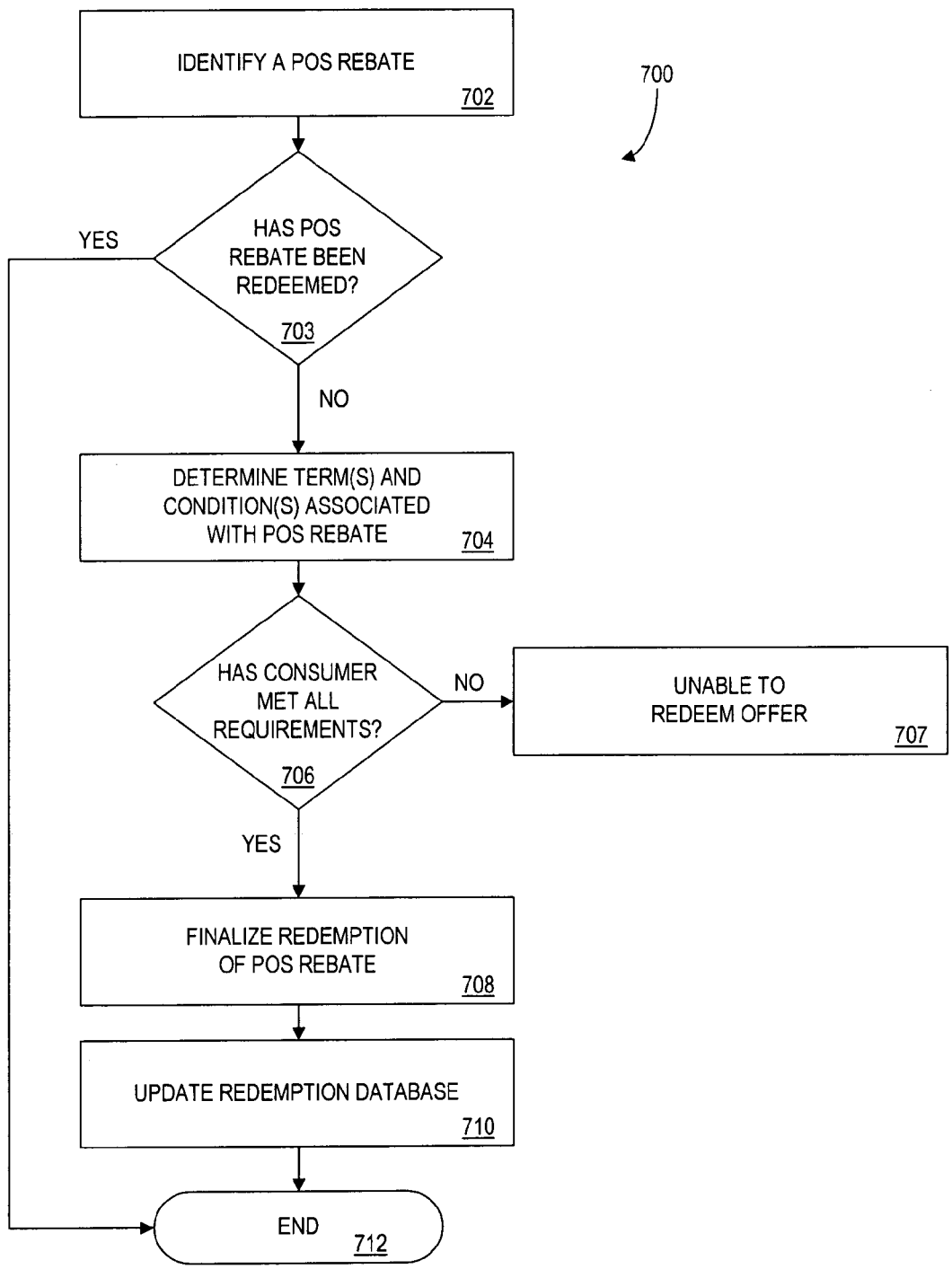

If the consumer accepts the POS rebate, the POS rebate issuance process 600 is complete and processing continues to FIG. 7 where the POS rebate is redeemed. The redemption process may be performed during the same transaction (e.g., during the same transaction and at the same terminal where the POS offer was issued), during several different transactions (e.g., the consumer may receive the POS rebate value at a POS terminal and complete the redemption process at a later time), and/or during a later transaction (e.g., the consumer may redeem the POS rebate from a home computer over the Internet). These alternative redemption processes are described below in conjunction with FIG. 7.

POS Rebate Redemption

According to embodiments of the present invention, POS rebates which have been issued to consumers (e.g., via the process of FIG. 6) may be redeemed in a variety of ways. In some embodiments, the POS rebate may be redeemed in the same transaction in which it is issued (e.g., the process of FIG. 7 is performed in the same transaction as the process of FIG. 6). As an example, if the POS rebate is for a cash payout, a reduction in the purchase price at the POS, or an alternative product offer (as indicated by the POS rebate term(s) and condition(s) in fields 312 and 314 of FIG. 3), the POS rebate is issued and redeemed at the same time by issuing the POS rebate and paying the rebate amount to the consumer, reducing the purchase price at the POS, or giving the consumer an alternative product in the same transaction.

In other embodiments, the POS rebate is redeemed some time after the POS rebate has been issued (e.g., the process of FIG. 7 is performed some time after completion of the process of FIG. 6). For example, some POS rebates may be redeemed by a consumer from a home computer, e.g., over the Internet. As anther example, if the POS rebate is for a store credit valued at 80% of the mail-in rebate amount (again, as indicated by the POS rebate term(s) and condition(s) in fields 312 and 314 of FIG. 3) the issuance may involve printing a POS rebate voucher and offering or otherwise presenting it to the consumer. The terms and conditions of the POS rebate may specify that the store credit can only be used in connection with a future purchase; that is, the consumer can only redeem the voucher in a subsequent transaction. These and other redemption processes will now be described by reference to FIG. 7.

One embodiment of a redemption process 700 is depicted in FIG. 7. Redemption of a POS rebate first involves the identification of the POS rebate (at 702). In one embodiment, this is performed by inputting an offer identifier (field 502 of FIG. 5) which identifies a specific POS rebate that has been issued. The offer identifier may be input by, for example: scanning the POS rebate at a POS device (e.g., where the offer identifier is printed in alphanumeric characters or in a bar code on a receipt or coupon), typing in the offer identifier at a POS device or at a computer connected to the Internet. Alternatively, specific POS rebates may be identified by identifying the particular consumer (e.g., by reference to the consumer's credit card number, driver's license number, or the like).

In embodiments where the POS rebate is redeemed some time after the POS rebate is issued, the identification of the POS rebate may also include an optional process of identifying the consumer. For example, the redemption database 224 (item 500 of FIG. 5) may include consumer identification information (field 504) to match the issued POS rebate to the corresponding consumer. A credit card number, driver's license number, frequent shopper number, personal identification number (PIN) or other identifier system may be utilized to identify consumers and reduce the likelihood of unauthorized rebate redemption.

As a further alternative, identification of the offer and/or the consumer may be performed by reading a transaction card which has recorded the terms and conditions of an issued POS rebate. In one embodiment, the transaction card contains a magnetic strip, integrated circuit, or other recording medium to record the terms and conditions of the POS rebate on the card itself. The card is then read at 702 to begin the redemption process. The transaction card provides a way of accumulating credits on a single medium, instead of having separate credits issued for each POS rebate. Similarly, where the consumer has a frequent shopper card and, e.g., has registered this as a consumer identifier (field 402 of FIG. 4), the credits may be stored in an account associated with the frequent shopper card.

In other embodiments, e.g., where the POS offer is both issued and redeemed in the same transaction at, e.g., a POS device, the offer identifier (field 502 of FIG. 5) has already been identified by the POS device (e.g., is stored in temporary memory of the POS device).

The offer identifier is used to retrieve information from the redemption database 500, including the redemption date 514 to determine whether the POS rebate has already been redeemed (at 703). This is an optional step for embodiments where the POS offer is both issued and redeemed in the same transaction. If the POS rebate has already been redeemed (e.g., the redemption date 514 is populated with a date that has past), the redemption process 700 ends and redemption is denied.

If the POS rebate identified by the offer identifier has not previously been redeemed, the procedure continues to 704 where the terms and conditions of the POS rebate are determined. These terms and conditions are retrieved from fields 508 and 510 of the redemption database 224 (table 500 of FIG. 5), and define the POS rebate as well as the steps that must be taken to redeem the offer. For example, a consumer identified by consumer identifier "111-222-333" (from field 504 of table 500) may have a POS rebate "11-22-33" (field 502 of table 500) which has a value of "$40.00" (field 508 of table 500). In order to redeem this offer, the consumer must comply with certain conditions—the "$40.00" can only be used as a "Retailer Credit" and the offer must be redeemed prior to "Jun. 1, 1999" (from field 510 of table 500).

Once the terms and conditions of the POS rebate have been identified, the procedure continues to 706 where the system determines whether the consumer has complied with all requirements to redeem the POS rebate. In the example of the offer identified by offer identifier "11-22-33", the system must determine if the expiration date of "Jun. 1, 1999" has passed and also if the POS rebate is being presented for redemption in a situation in which a "Store Credit" can be granted (e.g., is the POS rebate being presented at a participating "Electro" retailer?). If these redemption conditions are not met, the process terminates and the consumer is unable to redeem the POS rebate at this time (at 707). The consumer may be reminded of the terms and conditions of the POS rebate, and may be told why the rebate was unable to be redeemed (e.g., the rebate has expired, or the rebate must be presented at a particular retailer for a store credit, etc.). Further, if the POS rebate has expired, a consolation POS rebate may be made in an effort to maintain the good will of the consumer, or the consumer may be allowed to redeem the offer but may be penalized in future transactions.

A number of other terms and conditions can be checked at this stage. For example, if a mail-in rebate is contained in the packaging of a product, it is preferable to allow the consumer to surrender the original mail-in rebate when they return to the store to use the value of the credit, thereby obviating the need to open the package in the store. Thus, one redemption condition might be that the original rebate certificate has been surrendered. Alternatively, or in addition, the manufacturer may require a consumer to contact a manufacturer (e.g., go to a manufacturer's Web site) and input an identifier of the product and/or original manufacturer rebate. Registration via a manufacturer's (or retailer's) Interactive Voice Response Unit (IVRU) is also possible. The operator may then mark a data flag in the redemption database 224 (FIG. 2) to indicate that the redemption condition has been satisfied (or by otherwise removing that particular redemption condition), thereby indicating that the manufacturer rebate certificate has been effectively surrendered for further processing. Thus, the original manufacturer rebate would be voided, and even if it is received by the manufacturer, it would not be honored. This significantly reduces duplicate rebate redemptions.

In embodiments where the consumer has been given the choice of being able to immediately receive the value of the POS rebate (e.g., by receiving a discount at the POS, by receiving cash back at the POS, etc.) and the consumer has agreed to complete certain conditions to complete the redemption process, the consumer's compliance with those conditions is checked at this point. In certain embodiments, the consumer is required to secure the commitment by providing a credit or debit card account number and by authorizing a penalty amount to be charged to the account if the consumer fails to complete the required conditions to, complete the redemption process. This embodiment is particularly useful where the manufacturer rebate is contained in the packaging of a product which cannot be opened at the POS. In such an embodiment, if it is determined at 706 that the consumer did not fully complete the redemption process (e.g., did not surrender the manufacturer coupon, etc.), the central controller 102 may levy a penalty against the consumer at this time, e.g., by charging an agreed-upon amount to the consumer's credit card account.

Other conditions may be checked as well. For example, another condition may be that the POS rebate is only valid towards the purchase of a predetermined product or products. Thus, at the time of POS rebate redemption, the terminal 108 and/or the central controller 102 (FIG. 1) may determine whether the predetermined product(s) has been presented for purchase. Alternatively, the consumer may be presented with the choice of yet another POS rebate to be determined during the second transaction. The consumer may be granted the POS rebate having the higher value conditioned upon the purchase of another product by the manufacturer during the later transaction.

If the consumer has met all requirements for redemption of the POS rebate, the redemption process continues to 708 where the POS rebate is redeemed pursuant to the terms and conditions of the offer. For example, regarding the offer identified by offer identifier "11-22-33", the offer will be redeemed by giving consumer "111-222-333" an Electro store credit of "$40.00".

Upon redemption, redemption database 224 is updated (at 710) to reflect the redemption date (field 514 of FIG. 5). Once redeemed, a POS rebate cannot be redeemed again. This completes the redemption process 700.

A number of variations of the redemption process may be used. For example, the terms and conditions of the offer may specify that the value of a POS rebate will increase, for example, over time, or each time a consumer makes purchases without utilizing an issued POS rebate credit. For example, if a consumer is given a $50 POS rebate for the purchase of a given product or products, its value may later increase under certain conditions. For instance, the credit value increases, say, to $60 if the consumer waits one month (or, alternatively, a number of visits) before using the POS-issued credit. Alternatively, the value of the POS rebate may increase to $60 if the consumer has made two purchases of at least $50 without utilizing the issued POS rebate credit. Thus, the redemption parameter for such a POS rebate would be updated to indicate the number of visits, or the amounts of purchases, and/or whether this particular condition has been satisfied. The value of the rebate may also increase based on redemption statistics for a particular type of offer (e.g., if the redemption rate for a particular type of offer is very low, the value may increase for those consumers who actually redeem the offer), or based on other statistics.

In accordance with a further aspect of the invention, the POS rebate may be modified after it has been issued, as described above. For example, the POS rebate may be made more attractive, in order to motivate further purchases. Thus, a consumer may have been issued a POS rebate with or without certain associated redemption conditions; that is, at the time of issuance of the POS rebate, the consumer may be informed of any redemption parameters. Upon redemption, the consumer may then be presented with further POS rebates having higher values conditioned upon, e.g., the purchase of a predetermined product, or a total purchase amount higher than a threshold, such as $200.00.

The POS rebates issued in accordance with the above description may also be redeemed at other retail establishments. Such establishments may be predefined by the original retailer, and may include other establishments in an affinity group, for example. The value of the POS rebate may decrease if a consumer strays from the issuer of the POS rebate. The use of the issued POS rebate may be determined by certain conditions, such as other promotional offers, excess inventory, or calculated equivalency for the amount of the product. A value would be calculated based on an amount of credit from the original retailer as used at the second retailer. The value may be less than the original. For example, a $50 credit at a first store may be worth $20 at a second store. The first store would then compensate the second store for an amount of money, preferably no more than $20. Alternatively, the value of an issued POS rebate may stay the same if the consumer decides to purchase another product made by the manufacturer that issued the original POS rebate, regardless of the retailer that makes the sale.

In accordance with another aspect of the invention, the consumer may be informed of his current POS rebate status, and any updated offers or conditions. The information may be provided to the consumer, for example by way of a Web site where the user can log in and check his POS credit account, by way of a kiosk in the retail establishment where the user can either log in, scan and/or input an identifier the POS rebate credit or transaction card, or by way of e-mail notification.

POS Rebate Updating

The manufacturer conventionally determines the terms and conditions of manufacturer rebates associated with its products, including the value of the rebate. These offers may be, for example, distributed with the packaging of the associated product. According to one embodiment of the present invention, the manufacturer also establishes the terms and conditions of the POS rebate and makes this information accessible to retailers. For example, referring to FIG. 1, the POS rebates and information may be accessed and stored by the central controller 102 and/or terminals 108, 110, 112. Central controller 102 may access manufacturer and POS rebate information from manufacturer server 105 and store it so that it can be accessed by terminals 108, 110, 112.

The central controller 102 records the information in the rebate database 420. Alternatively, the terminals 108, 110, and 112 may query the manufacturer server 105. In these two embodiments, the manufacturer has direct control over the terms and conditions of a POS rebate throughout the promotional period. Central controller 102 and terminals 108, 110, 112 may communicate with a plurality of manufacturer servers 105. In an Internet embodiment, central controller 102 may comprise a Web server, and terminals 108, 110, 112 may comprise personal computers, kiosks, personal digital assistants (PDAs), or any other input/output devices able to communicate over a network. Web servers and/or terminals may communicate with manufacturer servers in order to access information regarding manufacturer and POS rebates.

In one embodiment, the terms and conditions of POS rebates are dynamically updated. For example, the manufacturer can monitor redemption statistics, and the associated total cost of the rebate promotion, and responsively adjust the value of a POS rebate. These adjustments can be performed by supplying updated terms and conditions of the POS rebate to the rebate database 420 in a number of ways, for example updates may be provided: on a periodic basis, e.g., daily or weekly, after a certain number of rebates have been redeemed, or in response to the actual redemption statistics. The update may be performed according to the manufacturer's required breakage rate (non-redemption rate). For example, a manufacturer may predict that 75% of all $100 manufacturer rebates will be redeemed (i.e., the manufacturer expects to pay out $75 per $100 manufacturer rebate, assuming that one-quarter of issued rebates will never be redeemed). The manufacturer may initially set the value of a POS rebate at $75, which means that a retailer may offer a consumer a POS rebate of $75 in exchange for each $100 manufacturer rebate. If the manufacturer receives a substantial number of manufacturer rebates and is thus paying the full $100 to consumers, the manufacturer may decide to lower the value of the POS rebate. For example, the manufacturer may lower the value of the POS rebate to $50, in order to maintain an average payout of $75 per $100 issued manufacturer rebate. Alternatively, the manufacturer may decide to increase the value of a POS rebate to increase consumer acceptance of the POS rebate, and lower manufacturer rebate acceptance/redemption. Conversely, if consumers are redeeming low numbers of manufacturer rebates, the manufacturer may offer $90 as a POS rebate. The value of POS rebates may be recalculated periodically, such as daily or weekly, or may be performed after a certain number of rebates have actually been processed.

In addition, or alternatively, the manufacturer may adjust the POS rebate by varying the conditions associated with the POS rebates. For example, partway through a promotion, the manufacturer may restrict the redemption of the POS rebate to apply only towards purchases of products made by a specific manufacturer(s), or may limit the time within which the rebate may be redeemed. The conditions can also be removed, or made easier to satisfy, such as by extending the time period for redemption.

The central controller 102 preferably records all accepted and/or rejected POS rebates in the database 104, and more particularly in redemption database 224. The data may then be analyzed to determine more efficient ways to ensure a higher acceptance rate. For example, when offers exhibit a low acceptance rate, the value of POS rebates may increase.

Retailer Compensation

In accordance with another aspect of the invention, the method further includes determining a retailer reimbursement value to be credited to the retailer. In this manner, the cost of the POS rebate program may be distributed between the manufacturer and the retailer. In one embodiment, the manufacturer absorbs the full amount of all issued POS rebate credits. That is, the manufacturer compensates the retailer for all POS rebates issued. The manufacturer may pay the retailer a bulk amount for each POS rebate for which the retailer issues credit (e.g. the total value of all issued POS rebates). In this embodiment, the redemption database 224 would be queried periodically (daily, weekly, monthly, etc.) to determine the value of all issued POS rebates per manufacturer. Based on the total value, each manufacturer would then determine the retailer reimbursement value to be credited to the retailer. For example, if a retailer issued $300 worth of POS rebates in a week, the manufacturer would credit the retailer reimbursement value of $300.

In another embodiment, the retailer is only reimbursed for the value of POS rebates that are actually redeemed by consumers (e.g. the manufacturer pays per redemption of store credit by consumers). For example, if a retailer issued $300 worth of POS rebates in one day, the manufacturer would not credit the retailer. If the retailer informs the manufacturer two weeks later that consumers redeemed $100 dollars of POS rebates since the issue date, the manufacturer credits the retailer for the $100. Such information may be derived from the redemption database 224.

In another embodiment, as mentioned above, the manufacturer may compensate the retailer based on a percentage of the value of issued POS rebates, rather than the full amount. This percentage may be calculated without regard to the actual credit redemption statistics.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. The system may utilize wireless communication systems, and involve portable handheld devices.

Preferred embodiments of the present invention have been described herein. It is to be understood, of course, that changes and modifications may be made in the embodiments without departing from the true scope of the present invention, as defined by the appended claims. In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements in various arrangements may be used in the block diagrams.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry.

What is claimed is:

1. A method, comprising:
identifying a product associated with a first rebate, the first rebate being redeemable by mailing a predetermined document associated with the first rebate to a first entity associated with the first product,
wherein the first rebate is redeemable for a first value;
determining whether a second rebate is associated with the product in a memory of a computing devices,
wherein the second rebate is redeemable for a second value that is different from the first value;
offering, if the second rebate is associated with the product and to a consumer, the second rebate in exchange for the first rebate;
obtaining the predetermined document, surrendered by the consumer at a retailer terminal operated by a second entity, such that the consumer can no longer redeem the first rebate; and
issuing the second rebate to the consumer.

2. The method of claim 1, wherein the second rebate has at least a first term based on a term of the first rebate.

3. The method of claim 1, wherein the second rebate has at least a first condition based on a condition of the first rebate.

4. The method of claim 1, wherein the first rebate is a manufacturer rebate and the second rebate is a POS rebate.

5. The method of claim 1, further comprising:
receiving an acceptance of the second rebate from the consumer.

6. The method of claim 1, further comprising redeeming the second rebate for compensation, the compensation including at least one of: (i) an alternative product; (ii) a retailer credit; (iii) a price reduction; (iv) a coupon; (v) a certificate; and (vi) cash.

7. The method of claim 6, wherein offering and redeeming is performed at the same terminal.

8. The method of claim 6, wherein offering is performed at a first terminal and redeeming is performed at a second terminal.

9. The method of claim 6, wherein redeeming further includes at least one of: (i) issuing a credit; (ii) crediting an account; and (iii) recording credit on a transaction card.

10. The method of claim 9, wherein the account is at least one of: (i) a retail store account; (ii) a credit card account; and (iii) a bank account.

11. The method of claim 6, wherein the compensation is modified at the time of a subsequent transaction and is based at least in part upon a product included in the subsequent transaction.

12. The method of claim 1, wherein the second rebate includes at least a first term and at least a first condition, the method further comprising updating the at least first term and the at least first condition based on information received from a manufacturer of the product.

13. The method of claim 12, wherein updating is performed based on redemption statistics.

14. The method of claim 12, wherein the second rebate includes at least one term determined based on consumer purchasing characteristics.

15. The method of claim 14, wherein the consumer purchasing characteristics include at least one of: (i) a purchase frequency; (ii) a total purchase value; and (iii) a rebate redemption rate.

16. The method of claim 6, wherein redeeming includes further determining at least a first term and at least a first condition associated with the second rebate.

17. The method of claim 1, wherein the second rebate is defined by at least a first redemption condition, the method further comprising:
receiving a commitment from the consumer to comply with the at least first redemption condition; and
providing the second value of the second rebate offer to the consumer.

18. The method of claim 17, wherein the commitment from the consumer includes information identifying a payment account and a penalty amount, the method further comprising:
applying the penalty amount to the payment account if the consumer fails to comply with the redemption condition.

19. The method of claim 18, wherein the penalty amount is equal to the second value of the second rebate.

20. The method of claim 6, wherein the second rebate includes at least a first condition identifying a number of consumer visits required before redeeming.

21. The method of claim 1, wherein the second value of the second rebate is established at a point of sale based at least in part on information about a purchase transaction.

22. The method of claim 1, wherein the second value of the second rebate increases for subsequent visits.

23. The method of claim 1, wherein the second rebate includes at least the second value of the second rebate and wherein the second value increases for subsequent visits, and includes a final value of zero indicating expiration of the second rebate.

24. The method of claim 1, wherein the second rebate includes a condition indicating a required redemption time.

25. The method of claim 24, wherein the second rebate includes the second value of the second rebate and wherein the second value decreases as redemption time increases.

26. The method of claim 24, wherein the second value of the second rebate increases for later redemption times.

27. The method of claim 24, wherein the second value of the second rebate decreases for later redemption times.

28. The method of claim 1, further comprising determining a retailer reimbursement value.

29. A method of processing rebates, comprising:
identifying a first rebate associated with a product, the first rebate being redeemable by mailing a predetermined document associated with the first rebate to a first entity associated with the first products,
wherein the first rebate is redeemable for a first value;
determining whether an alternative rebate is associated with the product in a memory of a computing devices, wherein the alternative rebate is redeemable for a second value that is different from the first value;
if the alternative rebate is associated with the product, accepting input indicative of a selection of the alternative rebate; and if selected,
obtaining the predetermined document, surrendered by a consumer at a retailer terminal operated by a second entity, such that the consumer can no longer redeem the first rebate; and
issuing the alternative rebate to the consumer.

30. The method of claim 29, wherein identifying a first rebate is performed by entering product information at a point of sale terminal.

31. The method of claim 29, wherein the second value of the alternative rebate is updated periodically.

32. The method claim 29, wherein a value term of the alternative rebate is updated after a predetermined number of purchases.

33. The method of claim 29, further comprising redeeming the alternative rebate for a credit in the same transaction in which the alternative rebate is issued.

34. The method of claim 29, further comprising redeeming the alternative rebate in a subsequent transaction.

35. A method, comprising:
identifying a product;
identifying a first rebate and a second rebate associated with the product, the first rebate being redeemable by mailing a predetermined document associated with the first rebate to a first entity associated with the first product,
wherein the first rebate is redeemable for a first value and the second rebate is redeemable for a second value that is different from the first value, and
wherein an offer for the second rebate is output via a point of sale terminal during a transaction in which the product is being purchased such that a value of the second rebate may be applied to the transaction by the point of sale terminal if the consumer accepts the second rebate;
receiving an acceptance of the second rebate from the consumer;
obtaining the predetermined document, surrendered by a consumer at a retailer terminal operated by a second entity, such that the consumer can no longer redeem the first rebate;
issuing the second rebate to the consumer; and
receiving a request from the consumer to redeem the second rebate.

36. The method of claim 35, further comprising:
redeeming the second rebate if the consumer has satisfied at least a first condition associated with the second rebate.

37. The method of claim 36, further comprising:
providing a value to the consumer if the consumer has satisfied the at least first condition.

38. The method of claim 35, wherein the second rebate is issued at a retail point of sale.

39. An apparatus comprising:
a processor, and
a memory that stores a program for directing the processor;
the processor being operative with the program to:
identify a product associated with a first rebate, the first rebate being redeemable by mailing a predetermined document associated with the first rebate to a first entity associated with the first product,
wherein the first rebate is redeemable for a first value;
determine whether a second rebate is associated with the product,
wherein the second rebate is redeemable for a second value;
if the second rebate is associated with the product, offer to a consumer the second rebate in exchange for the first rebate;

determine an indicator that the predetermined document has been surrendered by the consumer at a retailer terminal operated by a second entity, such that the consumer can no longer redeem the first rebate; and issue the second rebate to the consumer.

40. A computer readable medium encoded with instructions for directing a processor to:

identify a product associated with a first rebate, the first rebate being redeemable by mailing a predetermined document associated with the first rebate to a first entity associated with the first products, wherein the first rebate is redeemable for a first value;

determine whether a second rebate is associated with the product, wherein the second rebate is redeemable for a second value that is different from the first value;

if the second rebate is associated with the product, offer to a consumer the second rebate in exchange for the first rebate;

determine an indicator that the predetermined document has been surrendered by the consumer at a retailer terminal operated by a second entity, such that the consumer can no longer redeem the first rebate; and issue the second rebate to the consumer.

41. An apparatus comprising:

a processor, and a memory that stores a program for directing the processor;

the processor being operative with the program to:

identify a first rebate associated with a product, the first rebate being redeemable by mailing a predetermined document associated with the first rebate to a first entity associated with the first product, wherein the first rebate is redeemable for a first value;

determine whether an alternative rebate is associated with the product, wherein the alternative rebate is redeemable for a second value that is different from the first value;

if the alternative rebate is associated with the product, accept input indicative of a selection of the alternative rebate; and if selected, determine an indicator that the predetermined document has been surrendered by a consumer at a retailer terminal operated by a second entity, such that the consumer can no longer redeem the first rebate; and issue the alternative rebate to the consumer.

42. A computer readable medium encoded with instructions for directing a processor to:

identify a first rebate associated with a product, the first rebate being redeemable by mailing a predetermined document associated with the first rebate to a first entity associated with the first product, wherein the first rebate is redeemable for a first value;

determine whether an alternative rebate is associated with the product, wherein the alternative rebate is redeemable for a second value that is different from the first value;

if the alternative rebate is associated with the product, accept input indicative of a selection of the alternative rebate; and if selected, determine an indicator that the predetermined document has been surrendered by a consumer at a retailer terminal operated by a second entity, such that the consumer can no longer redeem the first rebate; and issue the alternative rebate to the consumer.

43. An apparatus comprising:

a processor, and a memory that stores a program for directing the processor;

the processor being operative with the program to:

identify a product;

identify a first rebate and a second rebate associated with the product, the first rebate being redeemable by mailing a predetermined document associated with the first rebate to a first entity associated with the first product, wherein the first rebate is redeemable for a first value and the second rebate is redeemable for a second value that is different from the first value, and wherein an offer for the second rebate is output via a point of sale terminal during a transaction in which the product is being purchased such that a value of the second rebate may be applied to the transaction by the point of sale terminal if the consumer accepts the second rebate;

receive an acceptance of the second rebate from the consumer;

determine an indicator that the predetermined document has been surrendered by a consumer at a retailer terminal operated by a second entity, such that the consumer can no longer redeem the first rebate;

issue the second rebate to the consumer; and receive a request from the consumer to redeem the second rebate.

44. A computer readable medium encoded with instructions for directing a processor to:

identify a product;

identify a first rebate and a second rebate associated with the product, the first rebate being redeemable by mailing a predetermined document associated with the first rebate to a first entity associated with the first product, wherein the first rebate is redeemable for a first value and the second rebate is redeemable for a second value that is different from the first value, and wherein an offer for the second rebate is output via a point of sale terminal during a transaction in which the product is being purchased such that a value of the second rebate may be applied to the transaction by the point of sale terminal if the consumer accepts the second rebate;

receive an acceptance of the second rebate from the consumer;

determine an indicator that the predetermined document has been surrendered by a consumer at a retailer terminal operated by a second entity, such that the consumer can no longer redeem the first rebate;

issue the second rebate to the consumer; and receive a request from the consumer to redeem the second rebate.

45. The method of claim 1, wherein the first value is greater than the second value.

46. The method of claim 1, wherein the first value is less than the second value.

* * * * *